United States Patent [19]

Yoshida Eiichi et al.

[11] Patent Number: 4,935,615
[45] Date of Patent: Jun. 19, 1990

[54] LIGHT INTENSITY CONTROL FOR LIGHT BEAM RECORDER

[75] Inventors: Yoshida Eiichi, Kobe; Kenjiro Hori, Yokohama; Takashi Nakahara, Kawasaki; Satoshi Akiyama, Yokohama, all of Japan

[73] Assignee: Canon Kabushiki Kaisha, Tokyo, Japan

[21] Appl. No.: 232,168

[22] Filed: Aug. 15, 1988

[30] Foreign Application Priority Data

Aug. 17, 1987 [JP] Japan ................... 62-203020

[51] Int. Cl.⁵ ............................. G01J 1/32
[52] U.S. Cl. .................... 250/205; 250/235
[58] Field of Search ........... 250/234, 235, 236, 205; 350/6.8; 358/206

[56] References Cited

U.S. PATENT DOCUMENTS

| | | | |
|---|---|---|---|
| 2,476,503 | 7/1949 | Maytum | 88/16.8 |
| 3,287,559 | 11/1966 | Barnes | 250/65 |
| 3,804,485 | 4/1974 | Clarke | 350/6.8 |
| 3,944,323 | 3/1976 | Starkweather | 358/206 |
| 4,070,681 | 1/1978 | Ichikawa et al. | 346/160 |
| 4,443,695 | 4/1984 | Kitamura | 250/205 |
| 4,695,714 | 9/1987 | Kimizuka et al. | 250/205 |

FOREIGN PATENT DOCUMENTS 2050531 4/1971 France.
2191303 12/1987 United Kingdom.

*Primary Examiner*—David C. Nelms
*Assistant Examiner*—Khaled Shami
*Attorney, Agent, or Firm*—Fitzpatrick, Cella, Harper & Scinto

[57] ABSTRACT

A beam recorder comprises a beam generator, a deflector for deflecting the beam to scan the beam, and a light intensity control unit for controlling a light intensity of the beam. The deflection has a plurality of deflection planes to which the beam is directed, and at least one of the deflection planes in a non-scan plane. The light intensity control is effected by utilizing a period in which the beam is directed to the non-scan plane.

9 Claims, 9 Drawing Sheets

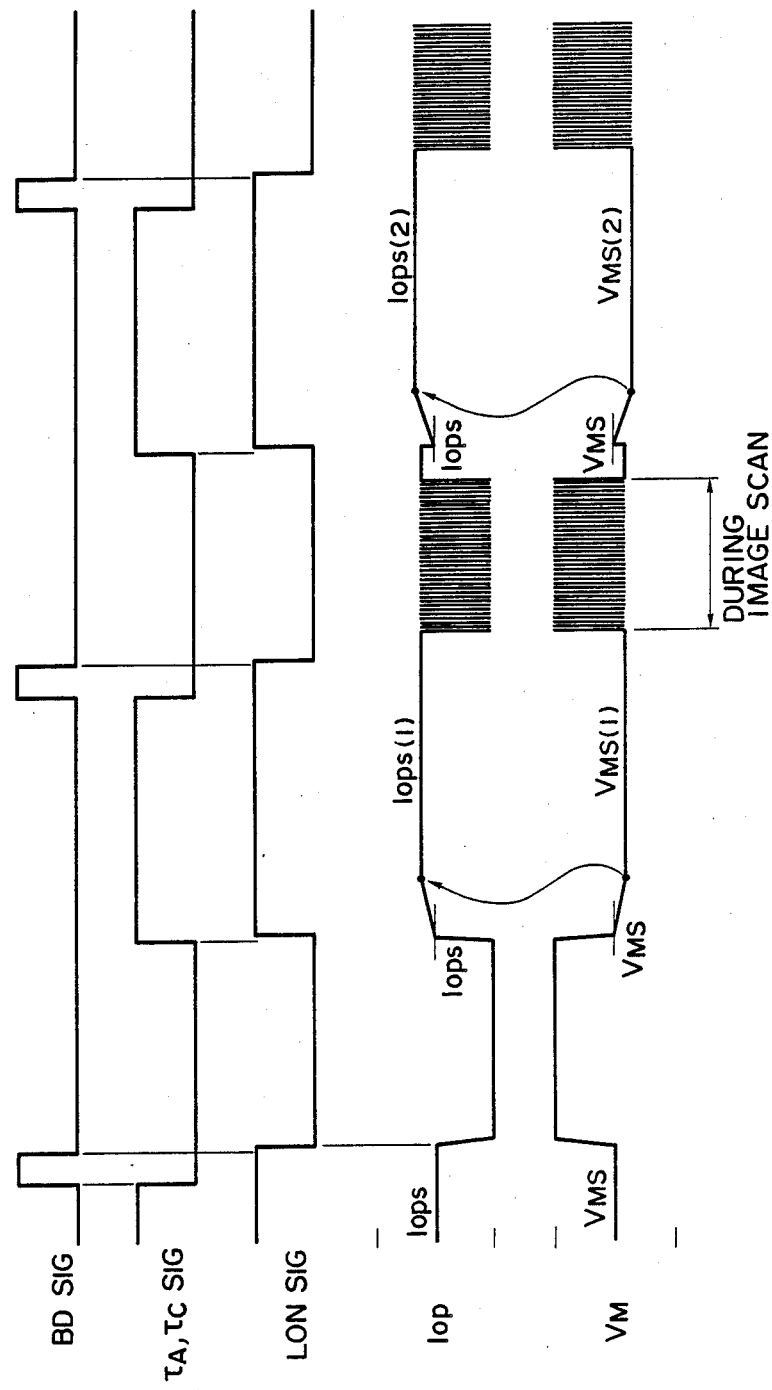

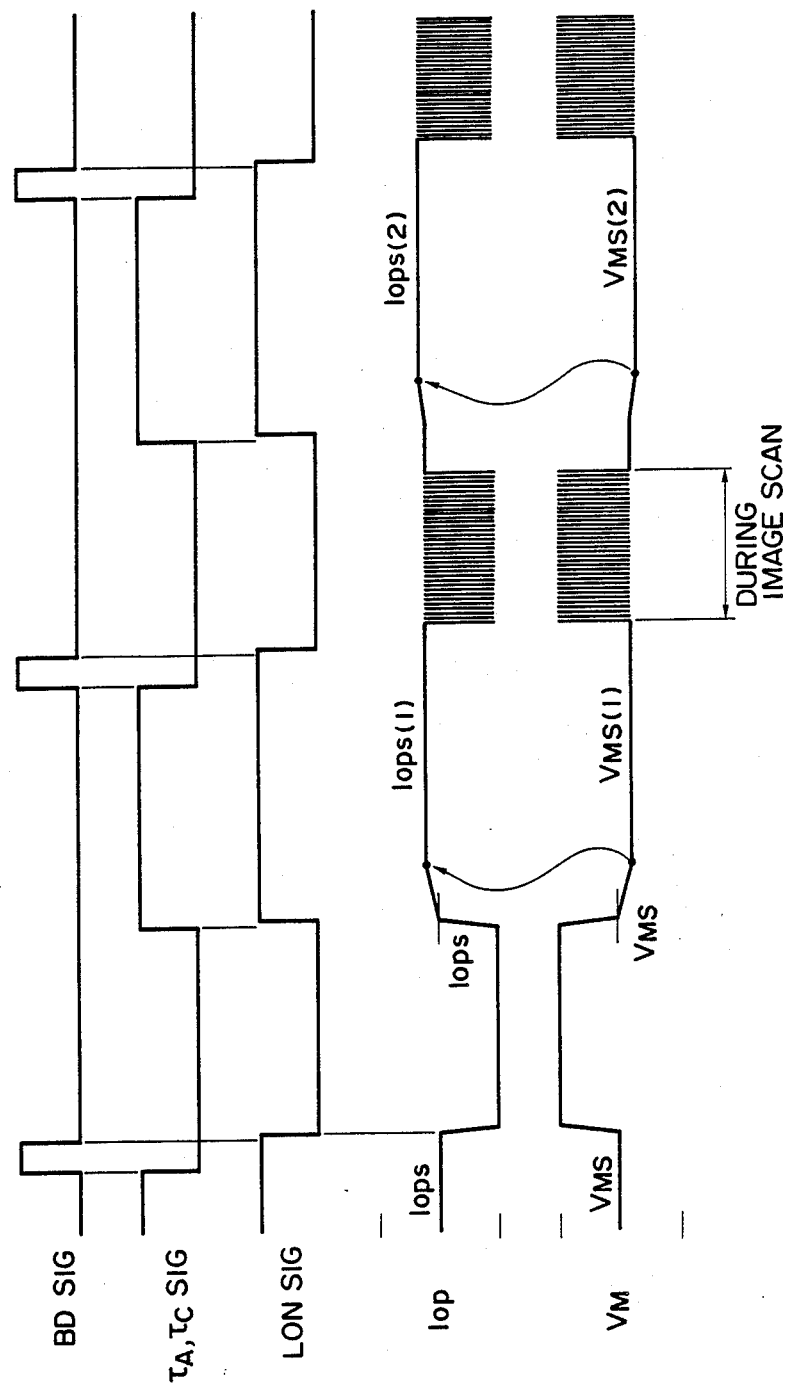

LIGHT INTENSITY CONTROL FOR LIGHT BEAM RECORDER

BACKGROUND OF THE INVENTION

1. Field of the Invention

The present invention relates to a beam recorder which records an image on a record medium by a beam.

2. Related Background Art

In a conventional laser beam printer of this type, a rotating polygon mirror for scanning a laser beam is constructed such that all planes thereof scan the beam for forming an image. Accordingly, for each of the planes of the rotating polygon mirror, it is necessary to attain high precision in planarity and parallelism of the planes. However, in actual, use since it is not possible to completely eliminate a difference between parallelisms of the planes, an optical system for compensating resulting ununiformity in the scan in a sub-scan direction (a correcting cylindrical lens) is required. As a result, the apparatus is complex and expensive in view of pat precision, number of parts, and assembly work of the parts. In a low speed and low grade apparatus, the number of planes of the rotating polygon mirror is reduced as much as possible to reduce a cost. Nevertheless, the complex and expensive construction has not yet been resolved.

In the conventional laser beam printer of this type, various restrictions are imposed when an intensity of the laser beam is to be controlled. A semiconductor laser is usually used as a laser light source for the laser beam printer of this type. The semiconductor laser has a disadvantage of variation of intensity with a temperature and reduction of intensity by deterioration. As a result, an intensity control system is adopted in which an output of a photo-sensor mounted in the semiconductor laser is detected to keep the laser light intensity constant.

FIG. 4 shows a laser light intensity control circuit. A microprocessor (MPU) 21 produces a laser on (LON) signal to turn on a transistor 27 and supplies a digital value to a D/A converter 22 to gradually increase the output of the D/A converter 22. As a result, a current $I_{OP}$ flowing through a laser diode 29 of a laser unit 28 gradually increases by a constant current circuit (CC) 24 so that a light intensity of the laser diode 29 increases. A laser beam from the laser diode 29 is emitted externally and also to an internal photo-diode 30. As a result, a photo-diode current $I_M$ which is proportional to the light intensity emitted externally flows. It is converted to a voltage $V_M$ by a resistor 31 and supplied to an amplifier (AMP) 25. The output of the amplifier 25 is supplied to an A/D converter 23 where it is converted to a digital signal, which is read by a microprocessor 21. The microprocessor 21 increases the output of the D/A converter 22 until the output read by the microprocessor 21 reaches a predetermined value, when the output of the D/A converter 22 is fixed. The digital value currently applied to the D/A converter 22 is stored and the signal LON is turned off. In this manner, the laser light intensity is controlled.

In a print mode, the microprocessor 21 applies the stored digital value to the D/A converter 22. A video (VDO) signal turns on and off a transistor 27 so that the laser diode 29 is turned on and off by a constant current pulse.

In the laser light intensity control system described above, it is necessary to continuously emit the laser beam when the light intensity of the laser is detected. Where the conventional rotating polygon mirror is used, the emitted laser beam is necessarily directed to a photosensitive member. Accordingly, if toner deposits to the photo-sensitive member, the toner is wasted. Accordingly, it is necessary to control the process such that the toner is not developed. In a one-sheet print operation, the process may be controlled prior to the actual print operation such that the toner is not developed and then the light intensity of the laser may be detected. In continuous print operation, because of the change of laser intensity by temperature, it is necessary to detect the laser light intensity between n-th printing and (n+1)th printing. Accordingly, in order to control the process such that the toner is not developed during that period, a complex process control is required, and fast response of the development process is required.

In the conventional laser beam printer of this type, the photo-sensitive member is deteriorated by the wasteful laser beam irradiation to the photo-sensitive member.

In order to attain stable light intensity and provide an inexpensive recorder, the assignee of the present invention proposed the apparatus disclosed in U.S. Pat. No. 4,201,994, U.S. Pat. No. 4,443,695, U.S. Pat. No. 4,695,714, and U.S. Ser. No. 149,526 (filed on Jan. 28, 1988). However, further improvement has been desired.

SUMMARY OF THE INVENTION

It is an object of the present invention to overcome the disadvantages described above.

It is another object of the present invention to improve a beam recorder.

It is other object of the present invention to provide a beam recorder which can reproduce a high quality image.

It is other object of the present invention to provide an inexpensive beam recorder.

It is other object of the present invention to provide a long-life or durable beam recorder.

It is other object of the present invention to provide a beam recorder of a simple construction which attains a stable light intensity.

It is other object of the present invention to provide a recorder which prevents degradation of a record medium.

It is other object of the present invention to provide a beam recorder which prevents complex construction or complex program.

It is other object of the present invention to provide an image recorder which eliminates restriction on sequence control when the laser light beam is controlled, saves degradation factor and waste for process elements such as photo-sensitive member and developing unit, and improves performance such as fine control of the laser light beam so that higher quality of image is attained.

Other objects of the present invention will be apparent from the following description which refers the accompanying drawings and claims.

BRIEF DESCRIPTION OF THE DRAWINGS

FIG. 11 shows a time chart for the laser light intensity control in a print mode, and FIG. 12 shows another time chart for the laser light intensity control in the print mode.

DETAILED DESCRIPTION OF THE PREFERRED EMBODIMENTS

A recorder of one embodiment of the present invention is an electrostatic recording type image recorder having an optical system for forming and scanning an image by a rotating polygon mirror and a laser beam emitted from a laser light source at least one of reflection planes of the rotating polygon mirror is a non-scan plane which does not form or scan the image and a laser light intensity is controlled while the laser beam is directed to the non-scan plane.

The present embodiment is now explained with reference to the drawings.

Figure 2:
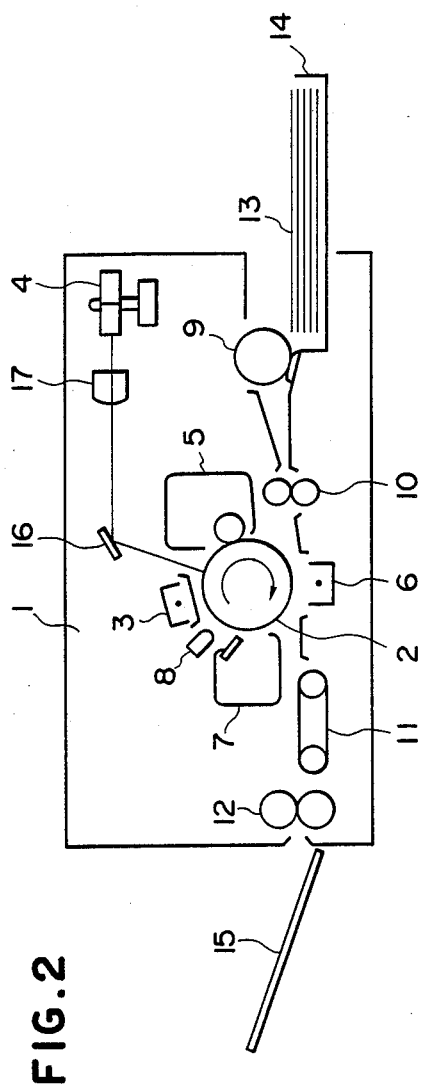
FIG. 2 shows an internal construction of the laser beam printer of the embodiment.

FIG. 2 shows a construction of the laser beam printer of the present embodiment. After power-on, a printer 1 checks if the temperature of a fixing unit 12 is proper, if sheets 13 are in a sheet cassette 14 and other internal status, and inform an external host controller (not shown) whether a print operation is ready or not. When the print operation is ready, the host controller sends a start of print command to the printer 1 as required so that the printer 1 starts the print operation. In the laser beam printer of the present embodiment, in order to initialize a surface potential of a photo-sensitive drum 2, a pre-exposure lamp 8, a primary charger 3 and a transfer unit 6 are activated and a polygon mirror 4 is rotated. As the photo-sensitive drum 2 is initialized and the rotation of the polygon mirror 4 is stabilized, a sheet 13 is fed from a sheet cassette 14 by a feed roller 9. When a leading edge of the sheet reaches a registration roller 10 and forms a loop, the feed of the sheet by the feed roller 9 is stopped and it stands by. The printer 1 then requests to the host controller to send a sub-scan direction synchronization signal (VSYNC signal). In response thereto, the host controller sends the VSYNC signal and sends an image signal (VDO signal) in synchronism with a main scan direction synchronization signal (BD signal) from the printer 1.

Figure 1A:
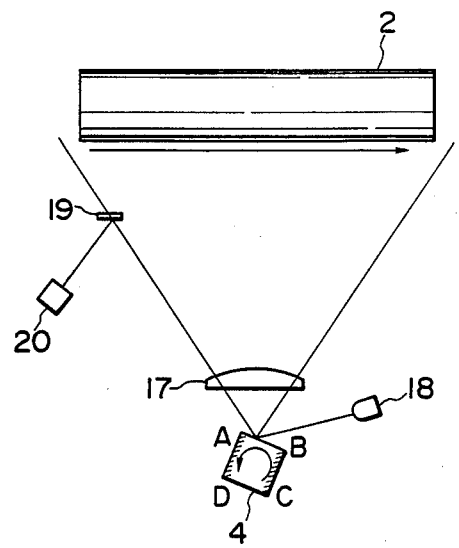
FIGS. 1A–1C show a schematic view of one embodiment of a laser beam printer of the present invention and timing charts of laser light intensity control which uses a polygon mirror of the embodiment.
Figure 3:
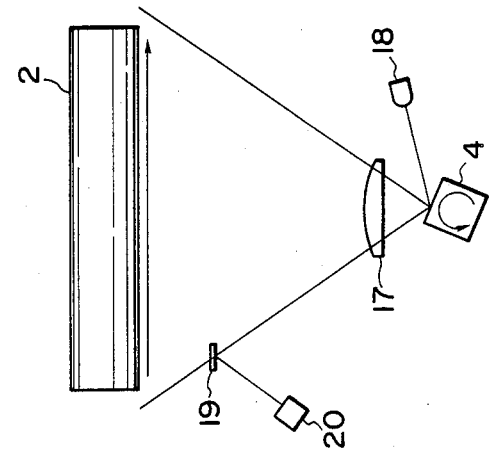
FIG. 3 shows laser beam scan by a polygon mirror of the embodiment and a BD signal detection method.

FIGS. 1A and 3 show laser beam scan by the polygon mirror and a method for detecting a BD (beam detector) signal. A laser beam emitted from the laser 18 is scanned by the polygon mirror 4 to form a light image on the photo-sensivive drum 2 in the main scan direction (arrow). The laser beam is directed to the photo-sensor 20 by the mirror 19 so that a synchronization signal (BD signal) indicating the beam scan position is produced. The mirror 19 is arranged outside of an area in which the laser beam form the light image on the photo-sensitive drum 2. The photo-sensor 20 is arranged at an equal distance to that from the polygon mirror 4 to the photo-sensitive drum 2. The laser beam reflected by the polygon mirror 4 is focused onto the photo-sensitive drum 2 by the f$\theta$ lens 17 and the mirror 16 of FIG. 2 to form the light image. The light image is then developed by the developing unit 5 into a toner image. The leading edge resigtration of the toner image and the sheet is effected by rotating the registration roller 10 in synchronism with the VSYNC signal. The toner image is transferred to the registered sheet by the transfer unit 6, and the sheet is fed to the fixing unit 12 by the feeder 11 where the toner image is fixed to the sheet. The sheet is then fed to the eject tray 15. The toner image which was not transferred to the sheet by the transfer unit 6 is scraped off the photo-sensitive drum 2 by the cleaner 7.

In a one-sheet print mode, the laser 18 is deactivated at the end of formation of the light image on the photo-sensitive drum 2 and the rotation of the polygon mirror 4 is stopped. At the end of transfer of the toner image to the sheet by the toner unit 6, the photo-sensitive drum 2 is initialized, and after the sheet has been ejected, the rotation of the photo-sensitive drum 2 is stopped to terminate the print operation. In a continuous print mode, after the image signal has been sent for the sheet on which the print operation is being effected, a start of print command for the next sheet is requested to the host controller. In response to the start of print command, the sheet 13 is fed from the sheet cassette 14 so that the print operation is continued.

Figure 5A:
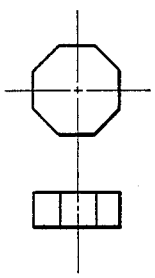
FIGS. 5A–5C show a conventional polygon mirror and the polygon mirror of the embodiment.
Figure 5B:
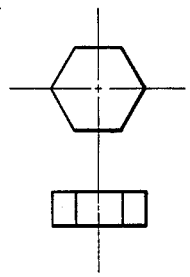
Figure 5C:
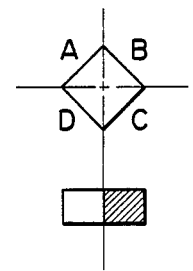

FIGS. 5A and 5B show conventional polygon mirror, and FIG. 5C shows the polygon mirror of the embodiment. FIG. 1A also shows the polygon mirror 4 which is similar to that shown in FIG. 5C. As shown in FIGS. 5A and 5B, the conventional polygon mirrors have six or eight reflection planes, all of which are micro-finished to reflect the laser beam at a high reflection factor. On the other hand, the polygon mirror of the embodiment has four planes as shown in FIG. 5C, and the planes A and C are not mirror-finished and are blank-coated (non-reflection coating) to reduce the reflection of laser beam as much as possible. Accordingly, it is the planes B and D that scan the beam for forming the image. As a result, the number of planes is $\frac{1}{2}$ to $\frac{1}{4}$ of that of the conventional polygon mirror and hence the polygon mirror of the embodiment must be rotated at a speed which is as 3–4 times high level that of the conventional polygon mirror. However, in the laser beam printer of the embodiment, the print speed is $\frac{1}{2}$–$\frac{1}{3}$ of that of the conventional printer. Accordingly, the rotation speed of the polygon mirror may be as 1–2 times high as that of the conventional mirror and this does not cause a practical problem. In the laser beam printer of the embodiment, an image exposure system is used so that the toner is developed only at the area on the photo-sensitive drum to which the laser beam was irradiated. Accordingly, the planes A and C are black-coated in order to minimize the reflection of the laser beam.

Figure 1B:
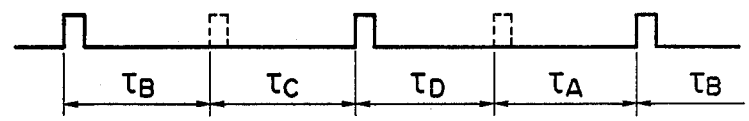
Figure 1C:
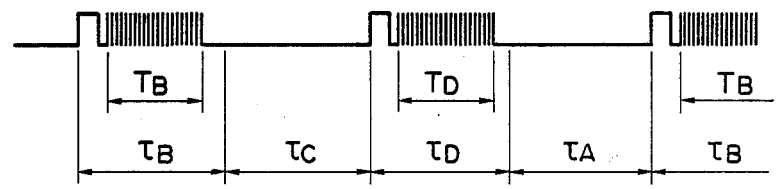
Figure 6A:
FIGS. 6A–6C show a BD signal in the conventional method and a BD signal in the embodiment, and a period of laser light intensity control.

FIG. 6A shows the BD signal produced when the planes A and C of the polygon mirror of FIG. 5C are not non-reflection planes. The BD signal produced by the polygon mirror of the embodiment shown in FIGS. 1B and 6B, which has non-reflection planes A and C does not appear in periods $\tau_A$ and $\tau_C$. The image is scanned on the photo-sensitive drum in periods $T_B$ and $T_D$, as shown in FIGS. 1C and 6C. Since the planes A and C are non-reflection planes, the photo-sensitive drum is not affected even if the laser is left activated at least during the periods $\tau_A$ and $\tau_C$. Accordingly, the laser beam intensity may be controlled during the periods $\tau_A$ and $\tau_C$. Thus, the waste of the toner by the prior art laser light intensity control, the complexity of process control to prevent the waste of the toner, and the degradation of the photo-sensitive member are prevented.

A method for detecting the laser light intensity control period is explained. In the present embodiment, the laser light intensity is controlled in the periods $\tau_A$ and $\tau_C$ of FIG. 6C. Since the laser beam is not reflected by the planes A and C, the BD signal cannot be directly obtained. Accordingly, it is necessary to separately produce a signal indicating the periods $\tau_A$ and $\tau_C$ or the starts of those periods.

Figure 4:
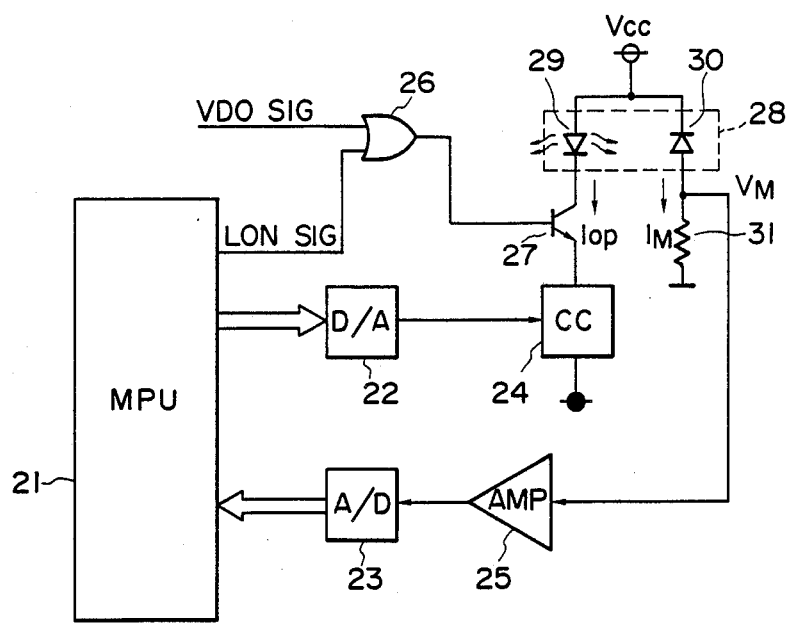
FIG. 4 shows a circuit diagram of laser light intensity control of the embodiment.
Figure 7A:
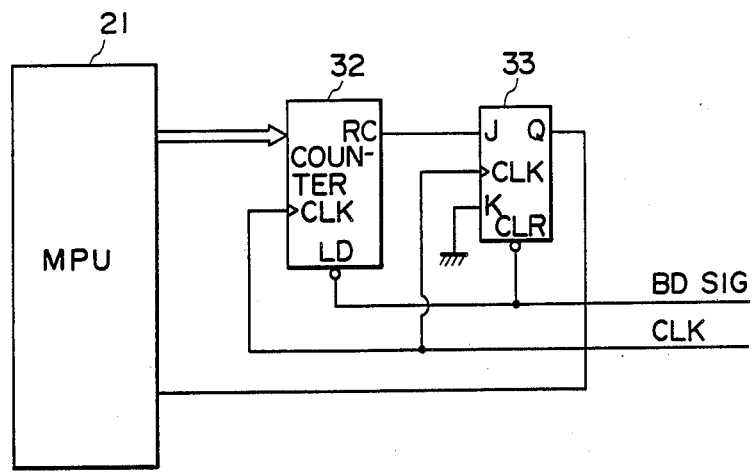
FIGS. 7A and 7B show a circuit diagram for detecting the laser light beam control period of the embodiment and a time chart of the operation.
Figure 7B:
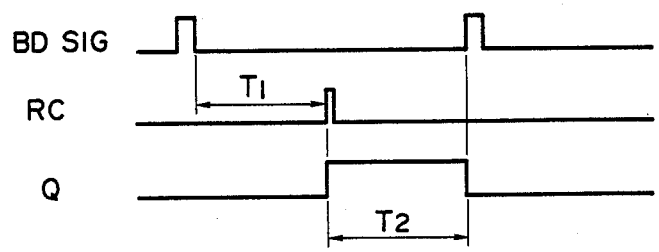

FIG. 7A shows a circuit diagram to produce the signal indicating the periods $\tau_A$ and $\tau_C$, and FIG. 7B shows an operational timing chart. A microprocessor 21 sets a count to a counter 32. The microprocessor 21 control the light intensity as shown in FIG. 4 and controls the sequential operation of the printer. The count may be set to the counter 32 by other circuit than the microprocessor 21. The counter 32 is reset by the BD signal and then counts the above count by a clock signal CLK. The clock signal CLK may be one which is in synchronism with a record clock used to transfer the image signal. The count is selected such that an RC signal is produced after $T_1$ time as shown in FIG. 7B. In the present embodiment, $T_1 \geq \tau_A$ (or $T_1 \geq \tau_A = \tau_b = \tau_C = \tau_D$). The counter 32 counts up to produce the RC signal, and a latch 33 latches it to produce an H-level Q-output, which is cleared by the next BD signal to assume an L-level. Accordingly, the period $T_2$ in which the Q-output of the latch 33 is H-level is not shorter than $\tau_A$ ($T_2 \leq \tau_A$, or $T_2 \leq \tau_A = \tau_B = \tau_C = \tau_D$), and the microprocessor 21 controls the laser light intensity in the period of the H-level Q-output.

Figure 8:
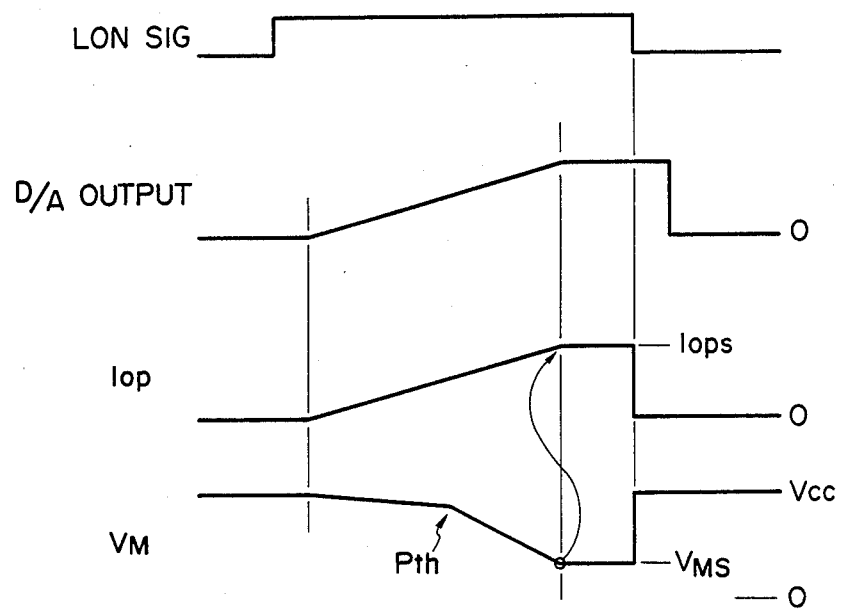
FIG. 8 shows a sequence of laser light intensity control of the embodiment and signal levels in the circuit.

FIG. 8 shows a timing chart for a sequence of laser light intensity control of the embodiment. The circuit shown in FIG. 4 is used as the laser light intensity control circuit, although other circuit may be used. The microprocessor 21 renders a LON signal to H-level to turn on a transistor 27, and supplies a digital value to a D/A converter 22, which produces a signal D/A as shown in FIG. 8. As a result, the output of the D/A converter 22 is gradually increased. Accordingly, a current $I_{OP}$ flowing through a laser diode 29 of a laser unit 28 gradually increases as shown in FIG. 8 by a constant current circuit 24 so that the light intensity of the laser diode 29 increases. The output beam of the laser diode 29 is also directed to a photo-diode 30 in the laser unit 28 and a photo-current $I_M$ which is proportional to the externally emitted laser beam intensity flows, and it is converted to a voltage $V_M$ by a resistor 31 and it is supplied to an amplifier 25. The output of the amplifier 25 is supplied to an A/D converter 23 where it is converted to a digital signal, which is read by the microprocessor 21. The microprocessor 21 increases the output of the D/A converter 22 until the digital signal reaches a predetermined value ($V_M = V_{MS}$), when it stops to increase the output. The microprocessor 21 stores the digital value applied to the D/A converter 22 when $V_M$ reaches $V_{MS}$, and renders the LON signal to L-level and renders the output of the D/A converter 22 to zero to terminate the laser light intensity control.

In the print mode, the microprocessor 21 renders the LON signal to the L-level and supplies to the D/A converter 22 the stored digital value for the predetermined light intensity. Under this condition, the VDO signal is driven by the constant current pulse. The laser light intensity control, that is, the detection of the level of the signal $V_{MS}$ of FIG. 8 is effected in the periods $\tau_A$ and $\tau_C$ of FIG. 6C. However, when the apparatus is powered on, the microprocessor 21 does not have the digital value to be supplied to the D/A converter 22 to produce the signal $V_{MS}$, because the laser current $I_{OPS}$ necessary to produce the predetermined light intensity differs from laser unit 28 to laser unit 28. Accordingly, before the image scan for the first print operation after the power-on, the microprocessor 21 must detects the $V_{MS}$ level. In order to detect the $V_{MS}$ level, the laser current $I_{OP}$ is supplied to some extent so that the laser diode 29 emits light. Otherwise, the output of the photo-sensor 20 for detecting the BD signal cannot be produced and the periods $\tau_A$ and $\tau_C$ of FIGS. 6B and 6C cannot be detected. Thus, when the $V_{MS}$ level is to be detected in the first laser light intensity control after the power-on, the laser current which is large enough to produce the BD signal may be supplied instead of gradually increasing the laser current $I_{OP}$ from zero. However, as described above, a relation between the laser current of the laser unit 28 and the light intensity differs from unit to unit, and in a conventional semiconductor laser, the laser device may be deteriorated or broken if it is operated over a specified maximum light intensity. For example, a laser A may emit a light below a maximum light intensity Pmax with the laser current $I_{OP1}$ but a laser B may emit a light above the maximum light intensity Pmax with the laser current $I_{OP1}$. A laser C may emit a light which is too weak to produce the BD signal with the laser current $I_{OP1}$. Accordingly, it is difficult to determine the initial value of the laser current $I_{OP}$ in the first laser light beam control, and the initial value may be set to zero or $I_{OP}$min which assures that the light intensity does not exceed the maximum light intensity for all lasers to be used. When those methods are used, the BD signal is not produced until the predetermined light intensity is reached in the laser light intensity control. In the present embodiment, the first laser light intensity control after the power-on is effected after the start of the print operation and the start of the rotation of the polygon mirror 4, and the initial laser current $I_{OP}$ is set to zero. Accordingly, until the first BD signal is produced as the laser current $I_{OP}$ increases, the laser beam is directed to all planes A, B, C and D of the polygon mirror of FIG. 5C. Thus, in the periods in which the laser beam is directed to the planes B and D, the laser beam is irradiated to the photo-sensitive drum 2. In the present embodiment, the process condition is controlled such that the toner is not developed in spite of the irradiation of the laser beam to the photo-sensitive drum 2 until the BD signal has a normal period as the laser current $I_{OP}$ is increased, that is, until the polygon mirror 4 is rotated at a normal rotation speed. In order to implement it, all outputs of the primary charger 3, the developing unit 5 and the transfer unit are turned off. Where the photo-sensitive drum 2 is initialized at the start of the rotation of the polygon mirror 4 and the laser light intensity control after the start of print operation in order to save wasteful time, only the primary charger 3 may be turned on. In this manner, the first laser light intensity control after the power-on is effected. If the detection of the predetermined laser light intensity is completed before the BD signal having the normal period is produced, the laser is activated at the predetermined light intensity until the BD signal of the normal period is produced. If the predetermined laser light intensity is not attained when the BD signal having the normal period is produced, the laser light intensity control is continued in the periods $\tau_A$ and $\tau_C$ of FIGS. 6B and 6C. In any case, when the laser light intensity control is completed and the BD signal having the normal period is produced, the laser is activated at the predetermined light intensity only at the timing to produce the BD signal until the actual print operation is started.

Figure 6B:
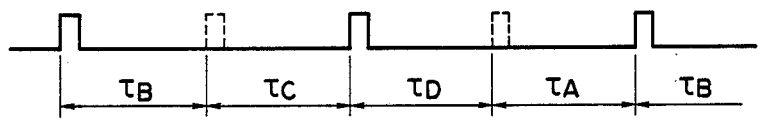
Figure 6C:
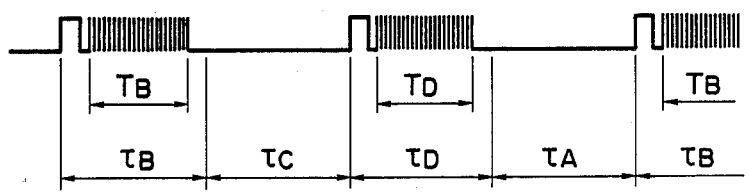

As described above, the laser light intensity control in the print mode is effected in the periods $\tau_A$ and $\tau_C$ of FIGS. 6B and 6C. The laser light intensity control may be effected between the n-th printing and the (n+1)th printing, that is, during the absence of the image scan, as well as during the image scan by utilizing the periods $\tau_A$ and $\tau_C$ of FIGS. 6B and 6C. In this manner, the image quality is improved by compensating for the variation of the laser light intensity for each line scan. The digital value to be supplied to the D/A converter 22 to supply the predetermined laser current $I_{OPS}$ in the first laser light intensity control after the power-on may be stored in a RAM of the microprocessor 21. Thus, in the subsequent laser light intensity control, the laser light intensity control may start from $I_{OP}=I_{OPS}$ or $I_{OP}=I_{OPS}-\alpha$ instead of $I_{OP}=0$ so that the light intensity control is finished in a shorter time. This is illustrated in FIG. 11. The start laser current $I_{OP_n}$ at the n-th laser light intensity control may be $I_{OPS}(n-1)$ or $I_{OPS}(n-1)-\alpha$, where $I_{OPS}(n-1)$ is the laser current produced in the (n−1)th control. This is illustrated in FIG. 12.

Figure 9A:
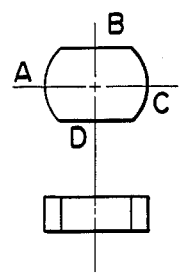
FIGS. 9A, 9B, 10A and 10B show polygon mirrors in other embodiments.

FIG. 9A shows a polygon mirror in another embodiment. In the present embodiment, the planes A and C are round so that the laser beams directed to the planes A and C are reflected to areas other than the photo-sensitive drum and the BD sensor.

Figure 9B:
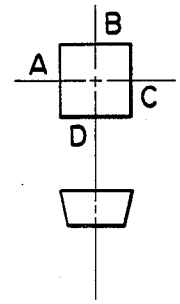

FIG. 9B shows a polygon mirror in other embodiment. In the present embodiment, the planes A and C are inclined relative to the planes B and D so that the laser beam is not reflected to the photo-sensitive drum or the BD sensor.

Figure 10A:
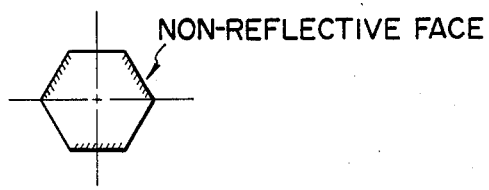
Figure 10B:
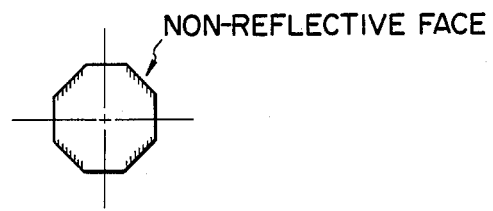

FIGS. 10A and 10B are polygon mirrors having more than four planes. In the present embodiment, the reflection plane and the non-reflection plane alternatively appear.

In the above embodiments, the laser light intensity control may be effected in either scan period or non-scan period of the image, or it may be continuously effected to improve the lifetimes of the apparatus and laser. Alternatively, it may be effected at any time such as periodically, at every predetermined number of printed sheets, or when a change in a temperature in a vicinity of the laser is detected.

In the above embodiment, the laser light intensity control is effected by continuously activating the laser until the BD signal has the normal period at the start of rotation of the polygon mirror. Alternatively, if the BD signal is produced and the periods $\tau_A$ and $\tau_C$ are longer than the period required to control the laser light intensity even if $\tau_B>\tau_D$ (or $\tau_C>\tau_A$), the laser light intensity control in the periods $\tau_A$ and $\tau_C$ may be started at this moment.

A circuit for generating a signal for assuring the periods $\tau_A$ and $\tau_C$ to be one half of the BD period may be provided to control the laser light intensity in the signal period.

The present invention is not limited to the above embodiments but various modifications thereof may be made without departing from the scope of the appended claims.

We claim:

1. A beam recorder comprising:
   beam generation means for generating a recording beam;
   deflection means for deflecting the beam to scan the beam generated by said beam generation means, said deflection means having at least one deflection portion to which the beam is directed for recording, and having at least one non-recording portion; and
   light intensity control means for controlling a light intensity of the beam;
   wherein said light intensity control means controls the light intensity of the beam only when the beam is directed to the non-recording portion.

2. A beam recorder according to claim 1, wherein said light intensity control means controls the light intensity of the beam by utilizing a period in whic the beam is directed to the non-recording portion.

3. A beam recorder according to claim 1, wherein said deflection means includes a rotating polygon mirror having a plurality of reflection portions and a non-reflection plane for the beam as the non-recording portion.

4. A beam recorder according to claim 2, further comprising:
   a record medium scanned by the beam deflected by said deflection means; and
   detection means for detecting a scan position of the beam and generating a detection signal for defining a start position of record on the record medium;
   said light intensity control means determining a timing to effect the light intensity control in accordance with the detection signal.

5. A beam recorder comprising:
   beam generation means for generating a recording beam;
   a rotating polygon mirror for forming and scanning an image by the beam generated by said generation means, said rotating polygon mirror having a plurality of portions;
   at least one of the portions of said rotating polygon mirror being a non-scan portion which does not function to form and scan the image; and
   light intensity control means for controlling a light intensity of the beam by utilizing a period in which the beam is directed to the non-scan portion.

6. A beam recorder according to claim 5, wherein said light intensity control means includes detection means for detecting a period in which the beam is directed to the non-scan portion of the rotating polygon mirror, and said detection means detects said period in accordance with a main scan synchronization signal produced when the beam is directed to a image forming and scanning portion.

7. A beam recorder according to claim 5, wherein said light intensity control means controls the light intensity of the beam during the period in which the beam is directed to a scanning portion of the rotating polygon mirror until the rotating polygon mirror reaches a predetermined rotation speed.

8. A beam recorder according to claim 7, further comprising:
   a photo-conductor scanned by the beam reflected by said rotating polygon mirror;
   means for visualizing the image formed on the photo-sensitive member by toner; and
   means for controlling the process such that the toner is not deposited to the photo-sensitive member until the rotating polygon mirror reaches the predetermined rotation speed.

9. A beam recorder according to claim 5, wherein said light intensity control means includes storage means for storing a light intensity control value, and the light intensity control for the beam is effected based on the light intensity control value stored in the storage means in the light intensity control after the rotating polygon mirror has reached the predetermined rotation speed.

* * * * *

UNITED STATES PATENT AND TRADEMARK OFFICE
CERTIFICATE OF CORRECTION

PATENT NO. : 4,935,615

DATED : June 19, 1990

INVENTOR(S) : YOSHIDA EIICHI ET AL.

It is certified that error appears in the above-identified patent and that said Letters Patent is hereby corrected as shown below:

On the title page:

AT [19] United States PATENT

"Yoshida Eiichi et al." should read --Yoshida et al.--.

AT [57] ABSTRACT

Line 4, "deflection" should read --deflector--.

AT [75] INVENTORS

"Yoshida Eiichi, Kobe;" should read
--Eiichi Yoshida, Kobe;--.

COLUMND 1

Line 21, "pat" should read --part--.

COLUMN 2

Line 61, "refers" should read --refers to--.

COLUMN 5

Line 34, "$T_b=$" should read --$T_B=$--.
Line 39, "not" should read --no--.

UNITED STATES PATENT AND TRADEMARK OFFICE
CERTIFICATE OF CORRECTION

PATENT NO. : 4,935,615

DATED : June 19, 1990

INVENTOR(S) : YOSHIDA EIICHI ET AL.

It is certified that error appears in the above-identified patent and that said Letters Patent is hereby corrected as shown below:

COLUMN 8

Line 26, "whic" should read --which--.

Signed and Sealed this

Seventh Day of April, 1992

Attest:

Attesting Officer

HARRY F. MANBECK, JR.

Commissioner of Patents and Trademarks